UNITED STATES PATENT OFFICE.

ARLIE WILLIAM SCHORGER, OF MADISON, WISCONSIN.

WATERPROOF COMPOSITION AND PRODUCT AND THE LIKE AND PROCESS OF PRODUCING THE SAME.

1,310,376.     Specification of Letters Patent.     Patented July 15, 1919.

No Drawing.     Application filed May 6, 1918. Serial No. 232,921.

*To all whom it may concern:*

Be it known that I, ARLIE W. SCHORGER, a citizen of the United States, residing at Madison, in the county of Dane, State of Wisconsin, have invented certain new and useful Improvements in Waterproof Compositions and Products and the like and Processes of Producing the Same; and I do hereby declare the following to be a full, clear, and exact description of the invention, such as will enable others skilled in the art to which it appertains to make and use the same.

This invention relates to improvements in waterproof and impregnated compositions and products and the methods of their production.

When sawdust or comminuted wood is subjected to a hydrolyzing treatment with acids, for example, by heating with about 2% of its weight of sulfuric acid and one to two times its weight of water for about fifteen minutes at a steam pressure of about 7 to 8 atmospheres, a portion of the wood is transformed into sugars and other soluble organic products, while the fibrous structure of the residue is completely destroyed if suitable conditions are maintained. This process is practised for the production of fermentable sugars from wood, which sugars are extracted and separated from the wood residue, leaving the wood residue as a by-product, and frequently as a waste product. This by-product or waste product, hereinafter referred to as hydrolyzed wood waste, is utilized in the process of the present invention and in the production of the products and compositions of the present invention.

The hydrolyzing treatment of the wood may be carried out under varying conditions as to amounts of acid and water employed, and temperatures and pressures maintained during the treatment; and the hydrolyzing treatment itself may, with advantage, form a part of the complete process of the present invention, as hereinafter more fully described.

When the sugars and other soluble products are leached or extracted from the products of hydrolysis, the hydrolyzed wood waste is left in a degraded and disintegrated state, with its fibrous structure destroyed. After drying, it is of a porous character and has high absorptive properties. According to the present invention, the hydrolyzed wood waste is reduced to a fine powder in a beater or other similar device, and further treated, if desirable or necessary, for the removal of portions of wood which have escaped disintegration, as by screening. The finely-divided hydrolyzed wood waste obtained by this treatment can be readily suspended in water and a suspension thereof is added to or admixed with a fibrous material possessing tensile strength, such as, for example, hair, asbestos, rags, cotton, wood pulp and other vegetable fibers of proper qualities; and the finely-divided wood waste and the fibrous material are uniformly admixed and incorporated and then made into a sheet or into other form in any suitable manner, for example, in the manner commonly employed for making sheets of paper or pulp in the paper-making art. Upon drying the sheet or other article, the composite product is left in a highly absorbent condition and is well adapted for the reception and retention of water-proofing and other impregnating compositions, and the sheet or other product is then subjected to impregnation with water-proofing or impregnating materials of various kinds, depending upon the particular object for which the resulting composition or product is desired. By proper impregnation of sheets of the absorbent mixture with asphalt or bitumen or other water-proofing compound or material, the resulting water-proof fabric may be used as a roofing material, for sheathing paper, and for like purposes.

The product produced will be of a composite character, due to the materials of which it is produced, and the manner of its production. The hydrolyzed wood waste, because of its distinguishing and advantageous qualities, will correspondingly improve the compositions containing it. The hydrolyzed wood waste can thus be readily disintegrated to a powder so that it can be uniformly and intimately admixed and incorporated with the fibrous material and the impregnating material. The hydrolyzed wood waste, when dried, is non-fibrous and possesses higher absorption properties than wood flour, or than most, if not all, fibrous materials possessing any considerable tensile strength, so that the compositions containing the hydrolyzed wood waste, after drying, can readily absorb considerable amounts of the waterproofing or other impregnating materials, and will hold these absorbed materials in a most intimate state of association. The hydrolized wood waste, moreover, dries more readily than wood flour, so that the process of production of the composite product is thereby benefited. The hydrolyzed wood waste can also be disintegrated into a finely pulverulent form more readily than non-hydrolyzed wood so that the production of the non-fibrous product of the present invention is, in this respect also, an improved process of production.

The invention will be described more in detail in connection with certain applications or embodiments thereof, but it will be understood that this more specific and detailed description is intended to be of an illustrative and not of a limiting character.

Comminuted wood in the form of sawdust or hulled or shredded material, for example, 100 pounds of pine sawdust calculated on the bone dry basis, is placed in a digester lined with acid-resisting material and capable of withstanding high pressure, and 100 pounds of a 2% acid such as sulfuric acid, are added and intimately distributed throughout the wood. Live steam is then introduced to obtain a steam pressure of about 120 pounds to the square inch and this pressure is maintained for about 15 minutes. The digester is then relieved and the treated sawdust is extracted with water, preferably in a series of diffusion cells, to remove the sugars and other soluble organic and inorganic matter, the hydrolyzed wood waste being thereby obtained substantially free from soluble constituents and in a form well adapting it for further treatment in accordance with the process of the present invention.

The aqueous extract obtained in the diffusion cells may be neutralized with lime or calcium carbonate to remove the excess sulfuric acid in the form of insoluble calcium sulfate, and the sugar solution thus obtained may be fermented for the production of alcohol or used for any desired purpose.

The hydrolyzed wood waste, freed from soluble constituents, may, with advantage, be used directly without drying in the further carrying out of the present process. For example, the hydrolyzed wood waste, still saturated with water, is placed in a beater and disintegrated by agitation. If necessary, the material may be screened to remove particles of wood which have escaped the action of the acid during the hydrolytic treatment. Preferably, however, the hydrolyzed wood waste is first passed through a jordan, tube mill, or similar apparatus, in order to obtain a highly disintegrated and finely pulverulent material.

The fine material suspended in water, is run into a beater, if the disintegration has not been carried out in a beater, and there is added, for each 20 parts of bone dry material contained in suspension, about 80 parts of Kraft pulp, rag stock, asbestos, or other appropriate fibrous material, and the whole is beaten to form a homogeneous mass. In the case of the use of a vegetable fiber, the material should not be beaten to a greater extent than necessary to form a homogeneous mass with the ligneous residue, so that objectionable hydration of the fibers, and reduction of their power of absorption when dry, will be prevented.

Owing to the non-fibrous character of the hydrolyzed wood waste, and to its finely disintegrated condition, it will readily intermix with the added fibers and form a filling or compounding material therefor, so that the composite product will be made up of the fibers and of the non-fibrous hydrolyzed wood waste, in a most intimate state of association.

The mixture of hydrolyzed wood waste and fiber is passed over a cylinder or felt paper-making machine and the resulting sheet is dried by passing over rotating steam-heated drums or otherwise; or the mixture is otherwise treated for producing products of the desired shape prior to the drying thereof. When the mixture is made into a sheet and dried, the dried sheet will not only contain the hydrolyzed wood waste and fibrous material in a most intimate state of association, but this material will have improved absorptive properties due to the hydrolyzed wood waste, while still retaining the desired strength due to the fibrous content thereof. The fibrous material also will have absorptive properties and will absorb to a greater or less extent the water-proofing or other materials subsequently applied.

Because of the improved absorptive properties of the dried sheet, it will readily absorb liquid-impregnating or water-proofing solutions and compositions which are applied thereto. This water-proofing or impregnation may, with advantage, follow immediately after the drying of the sheet so that the dried sheet, as it comes from the paper-making and drying machine, is carried by rolls through a bath of hot or liquid coal tar pitch, or through a bath of rosin size, or other suitable water-proofing materials either of a liquid character, such as solutions of the water-proofing materials, or of a molten character made of constituents normally solid and liquefied by heat.

The impregnated or water-proof sheet as it comes from the impregnating or water-proofing bath may be passed through squeeze rolls to remove the excess water-proofing material. In some cases, the sheet will then be completed and ready for use. Sheathing paper may thus be produced, where proper impregnating materials such as coal tar pitch are employed, and the sheet, after removal of the excess pitch, is ready for use for water-proofing purposes, or it can be further dried or treated for preventing stickiness or for imparting special surfaces thereto. For example, the sheet, while still adhesive, may be provided with a layer or coating of crushed slate or similar material, dusted thereon or otherwise applied, so that the resulting sheet will be fire-retardant and more resistant to the action of the elements, as when the sheet is to be used for roofing and similar purposes.

The sheet may be treated with fire-resistant or fire-proofing compositions prior to the water-proofing or impregnation treatment, or such fire-proofing treatment may be combined with the main water-proofing or impregnation treatment.

It will be understood that various other materials may be incorporated with the products and compositions of the present invention and that various impregnating and water-proofing materials may be employed. Whatever the water-proofing or impregnating material, the composite sheet or product to which it is applied, because of its composition and properties, will absorb the same in an improved manner to give a resulting product containing the water-proofing or impregnating materials intimately associated therewith.

Claims:

1. The method of making impregnated compositions and products, which comprises intimately incorporating fibrous materials and the residue remaining from the hydrolysis of wood with each other to form a composite product of improved absorptive properties, and subjecting the resulting product to an impregnating treatment.

2. The method of producing impregnated compositions and products, which comprises subjecting sawdust or finely divided wood to hydrolysis, with the production of sugars and destruction of the fibrous structure of the wood, extracting the sugars and other soluble constituents from the hydrolyzed product, intimately incorporating the moist hydrolyzed residue with a fibrous material to form a composite product, and subjecting the composite product to an impregnating treatment.

3. The method of producing impregnated compositions and products, which comprises subjecting sawdust and the like to hydrolysis with acids, removing water-soluble constituents from the hydrolyzed product, subjecting the moist hydrolyzed residue to disintegration with the production of a finely pulverulent product, incorporating the finely-divided product with a fibrous material to form a pulp, converting the said pulp into a sheet and drying the same, and subjecting the dried sheet to an impregnating treatment.

4. The method of making impregnated compositions and products, which comprises reducing hydrolyzed wood waste to a fine powder, intimately incorporating the resulting fine powder with a fibrous material having tensile strength, and subjecting the resulting composite product to an impregnating treatment.

5. The method of making impregnated compositions and products, which comprises reducing hydrolyzed wood waste to a fine powder, in the presence of water, and thereby forming a suspension of the powder in water, incorporating therewith a fibrous material possessing tensile strength, subjecting the resulting composite product to a sheeting operation to convert the same into a sheet, drying the sheet thus produced, and subjecting the dried sheet to an impregnating treatment.

6. The method of producing impregnated compositions and products, which comprises reducing to a fine powder the residue remaining from the hydrolysis of wood, incorporating the resulting powder with a fibrous material having tensile strength, forming such composite material into a sheet, drying the resulting sheet, and impregnating the sheet with a waterproof material.

7. As new articles of manufacture, waterproof compositions and products, comprising hydrolyzed wood waste and a fibrous material having tensile strength intimately associated with each other, and impregnated with a waterproofing composition or material.

8. As new articles of manufacture, waterproofed webs or sheets, comprising hydrolyzed wood waste and a fibrous material having tensile strength intimately associated with each other, and formed into a web or a sheet, and impregnated with a waterproofing composition or material.

9. As new articles of manufacture, waterproof compositions and products, comprising hydrolyzed wood waste and a fibrous material having tensile strength intimately associated with each other, and sufficiently impregnated with a waterproofing agent of suitable character to increase the strength of the impregnated compositions and products.

10. As new articles of manufacture, waterproof webs and sheets, comprising hydrolyzed wood waste and a fibrous material having tensile strength, intimately associated with each other and formed into a web or a sheet and impregnated with a waterproofing composition or material imparting increased strength to the web or sheet.

11. As new articles of manufacture, waterproof webs or sheets, comprising hydrolyzed wood waste and a fibrous material having tensile strength intimately associated with each other, and impregnated with a waterproofing composition adapting the resulting product for use for roofing purposes, and the waterproofed sheet being provided with a layer of fire-retardant material.

12. As new articles of manufacture, compositions and products, comprising a fibrous material having tensile strength and the residue remaining from the hydrolysis of wood intimately associated with each other, and formed into the shape of the desired product, such product being of a porous and absorbent character, and adapted to be readily impregnated with waterproofing materials and compositions.

13. As new articles of manufacture, webs or sheets, comprising a fibrous material having tensile strength and the residue remaining from the hydrolysis of wood intimately associated with each other, and formed into a web or sheet, said web or sheet being of a porous and absorbent character and adapted to be readily impregnated by waterproofing compositions and products.

14. As new articles of manufacture, webs or sheets, comprising a fibrous material having tensile strength and the residue remaining from the hydrolysis of wood intimately associated with each other, both the hydrolyzed wood waste and the fibrous material being of a more absorbent character than wood flour, and said webs and sheets having improved absorbent properties, and being adapted to be readily impregnated with waterproofing compositions and materials.

In testimony whereof I affix my signature.

ARLIE WILLIAM SCHORGER.